United States Patent
Yoshida et al.

(10) Patent No.: US 9,055,526 B2
(45) Date of Patent: Jun. 9, 2015

(54) APPARATUS AND METHOD FOR PERFORMING EFFICIENT RETRANSMISSION

(71) Applicant: FUJITSU LIMITED, Kawasaki-shi, Kanagawa (JP)

(72) Inventors: Hideaki Yoshida, Sagamihara (JP); Takafumi Kawashima, Yokohama (JP); Yukimasa Yoshida, Machida (JP); Tomoaki Kaneda, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 97 days.

(21) Appl. No.: 14/017,719

(22) Filed: Sep. 4, 2013

(65) Prior Publication Data
US 2014/0120844 A1 May 1, 2014

(30) Foreign Application Priority Data
Oct. 30, 2012 (JP) ................................. 2012-239609

(51) Int. Cl.
*H04B 15/00* (2006.01)
*H04W 56/00* (2009.01)

(52) U.S. Cl.
CPC .................................... *H04W 56/00* (2013.01)

(58) Field of Classification Search
CPC .... H04W 56/00; H04L 1/1835; H04L 1/1874
USPC ............. 455/502, 517, 69, 70; 370/324, 390, 370/394
See application file for complete search history.

(56) References Cited

U.S. PATENT DOCUMENTS

| | | | |
|---|---|---|---|
| 2005/0235190 A1 | 10/2005 | Miyazaki et al. | |
| 2006/0245428 A1* | 11/2006 | Yanamoto et al. | 370/394 |
| 2009/0245252 A1* | 10/2009 | Konishi et al. | 370/390 |
| 2010/0118876 A1* | 5/2010 | Meyer et al. | 370/394 |

FOREIGN PATENT DOCUMENTS

| | | |
|---|---|---|
| JP | 2007-150859 A | 6/2007 |
| JP | 2008-219408 A | 9/2008 |
| WO | WO 2004/107639 A1 | 12/2004 |

* cited by examiner

*Primary Examiner* — Tuan Pham
(74) *Attorney, Agent, or Firm* — Arent Fox LLP

(57) ABSTRACT

A communication device calculates a signal travelling time indicating a time period from a first time at which the signal has been transmitted from the communication device, to a second time at which the transmitted signal is expected to arrive at another communication device serving as a communication partner. The communication device retransmits the signal to the another communication device when a retransmission request of the signal is received from the another communication device after the signal has been transmitted to the another communication device, and suspends a retransmission of the signal when the retransmission request is received again from the another communication device before the signal travelling time elapses from the first time.

6 Claims, 11 Drawing Sheets

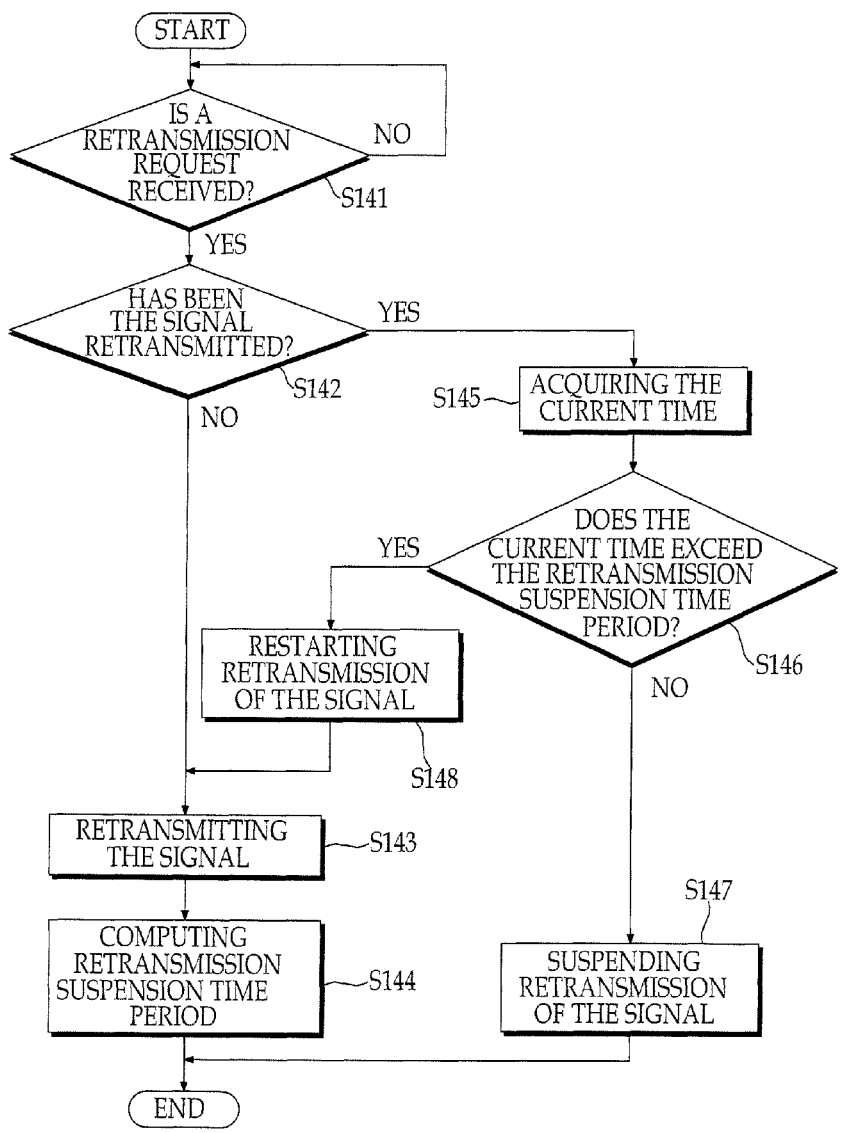

APPARATUS AND METHOD FOR PERFORMING EFFICIENT RETRANSMISSION

CROSS-REFERENCE TO RELATED APPLICATION

This application is based upon and claims the benefit of priority from the prior Japanese Patent Application No. 2012-239609, filed on Oct. 30, 2012, the entire contents of which are incorporated herein by reference.

FIELD

The present disclosure relates to apparatus and method for performing efficient retransmission.

BACKGROUND

There has been a known technology in which when a communication device of a calling party transmitting a signal to a communication device of a communication partner receives a retransmission request of signal from the communication device of the communication partner, the communication device of the calling party upon receiving the retransmission request retransmits the signal to the communication device of the communication partner. Hereinafter, the communication device of the calling party which transmits a signal to the communication device of the communication partner is referred to as a "communication device A". Also, the communication device of the communication partner which transmits the retransmission request of signal to the communication device A is referred to as a "communication device B"

Related techniques are disclosed in, for example, Japanese Laid-Open Patent Publication No. 2007-150859, Japanese Laid-Open Patent Publication No. 2008-219408, and International Publication No. WO 2004/107639.

In the related art, however, there is a concern that the communication speed between the communication devices may be reduced due to the retransmission of signals by the communication device that received the retransmission request.

FIG. 9 is a diagram illustrating an example of a retransmission issue of signal in the related art. In the example of FIG. 9, the communication device A is a base station and the communication device B is a mobile terminal. FIG. 9 illustrates the state of the communication between the communication device A and the communication device B in a chronological order. Further, the details of the state of the communication illustrated in FIG. 9 are described in Chapter 11.5.2. of GPP TS 25.322 V10.1.0.

First, the communication device A transmits signal "a" having a sequence number of 0 (zero) to the communication device B (step S1). It is assumed that the signal "a" arrives at the communication device B. Subsequently, the communication device A transmits signal "b" having a sequence number of 1 (one) to the communication device B (step S2). It is assumed that the signal "b" does not arrive at the communication device B. Subsequently, the communication device A transmits signal "c" having a sequence number of 2 (two) to the communication device B (step S3). It is assumed that the signal "c" arrives at the communication device B. Subsequently, the communication device A transmits signal "d" having a sequence number of 3 (three) to the communication device B (step S4). It is assumed that the signal "d" does not arrive at the communication device B. Subsequently, the communication device A transmits signal "e" having a sequence number of 4 (four) to the communication device B (step S5). It is assumed that the signal "e" arrives at the communication device B.

In the meantime, the communication device B which has received the signal "c" detects that the signal "b" has been missed and transmits a retransmission request of the signal "b" to the communication device A (step S6). The communication device B which has received the signal "e" has not yet received the signal "b" and signal "d". Therefore, the communication device B detects that the signal "b" and signal "d" are missed and transmits a retransmission request of the signal "b" and a retransmission request of the signal "d" to the communication device A (step S7).

The communication device A which has received the retransmission request of the signal "b" transmitted at step S6 retransmits the signal "b" to the communication device B (step S8). It is assumed that the signal "b" arrives at the communication device B. The communication device B which has received the signal "b" has not yet received the signal "d". Therefore, the communication device B detects that the signal "d" is missed and transmits a retransmission request of the signal "d" to the communication device A (step S9). In the meantime, since the communication device A which has received the retransmission request "b" and the retransmission request "d" transmitted at step S7 has received the retransmission request of the signal "b" again although the communication device A has retransmitted the signal "b" at step S8, the communication device A retransmits the signal "b" to the communication device B (step S10). The communication device A retransmits the signal "d" after the retransmission of the signal "b" at step S10 (step S11). In the meantime, since the communication device A which has received the retransmission request of the signal "d" transmitted at step S9 has received the retransmission request of the signal "b" again although the communication device A has retransmitted the signal "d" at step S11, the communication device A retransmits the signal "d" to the communication device B (step S12).

SUMMARY

According to one aspect of the present disclosure, there is provided a communication device. The communication device calculates a signal travelling time indicating a time period from a first time at which the signal has been transmitted from the communication device, to a second time at which the transmitted signal is expected to arrive at another communication device serving as a communication partner. The communication device retransmits the signal to the another communication device when a retransmission request of the signal is received from the another communication device after the signal has been transmitted to the another communication device, and suspends a retransmission of the signal when the retransmission request is received again from the another communication device before the signal travelling time elapses from the first time.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of an operational flowchart for retransmitting of signal by a communication device, according to an embodiment.

DESCRIPTION OF EMBODIMENTS

Figure 9:
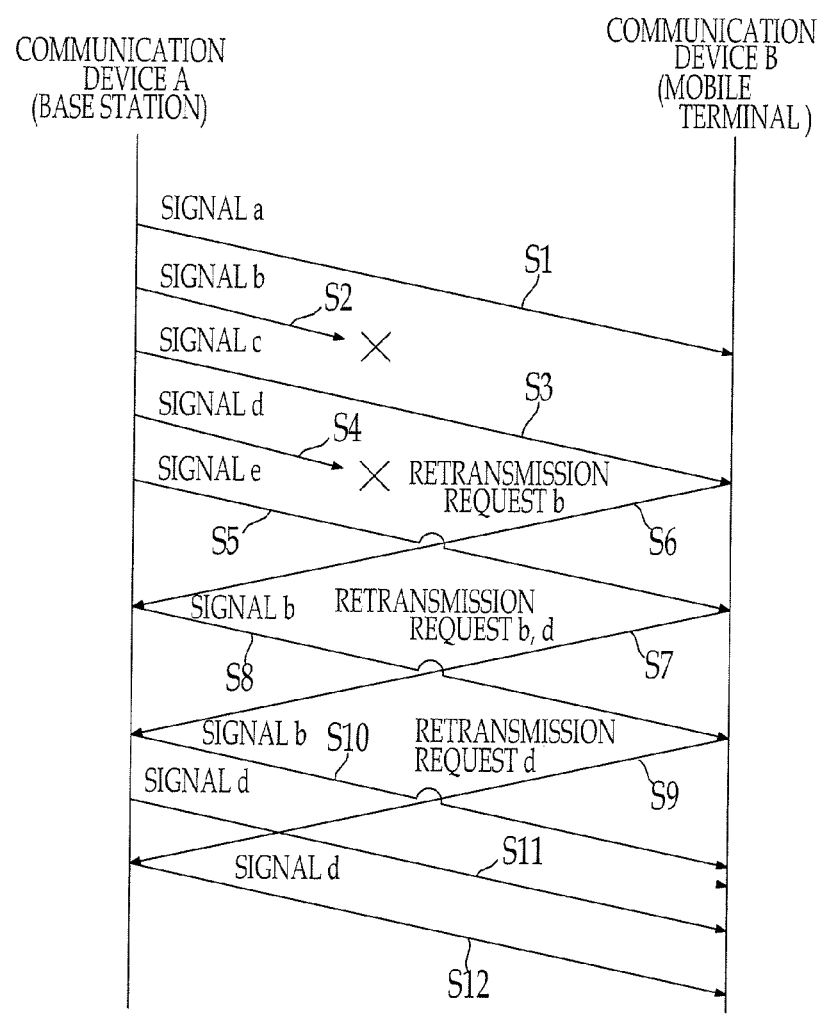
FIG. 9 is a signal sequence chart illustrating a retransmission issue of signal in the related art.

As can be seen from FIG. 9, since the communication device A retransmits the signal "b" at step S8 and also retransmits the signal "d" at step S11, retransmission of the signal "b" at step S10 and retransmission of the signal "d" at step S12 may not be performed. Nevertheless, since an amount of data in a communication path between the communication devices increases due to the retransmission of the signal "b" at step S10 and the retransmission of the signal "d" at step S12 by the communication device A, there is a concern that a communication overhead between the communication devices may increase.

The disclosed technology has been made in an effort to solve the problems and intends to provide a communication device and a communication method capable of reducing the communication overhead between the communication devices due to the retransmission of signals.

In the following, embodiments of a communication device and a communication method disclosed herein will be described with reference to the accompanying drawings. Further, a technology disclosed herein is not limited to the embodiments.

Figure 1A:
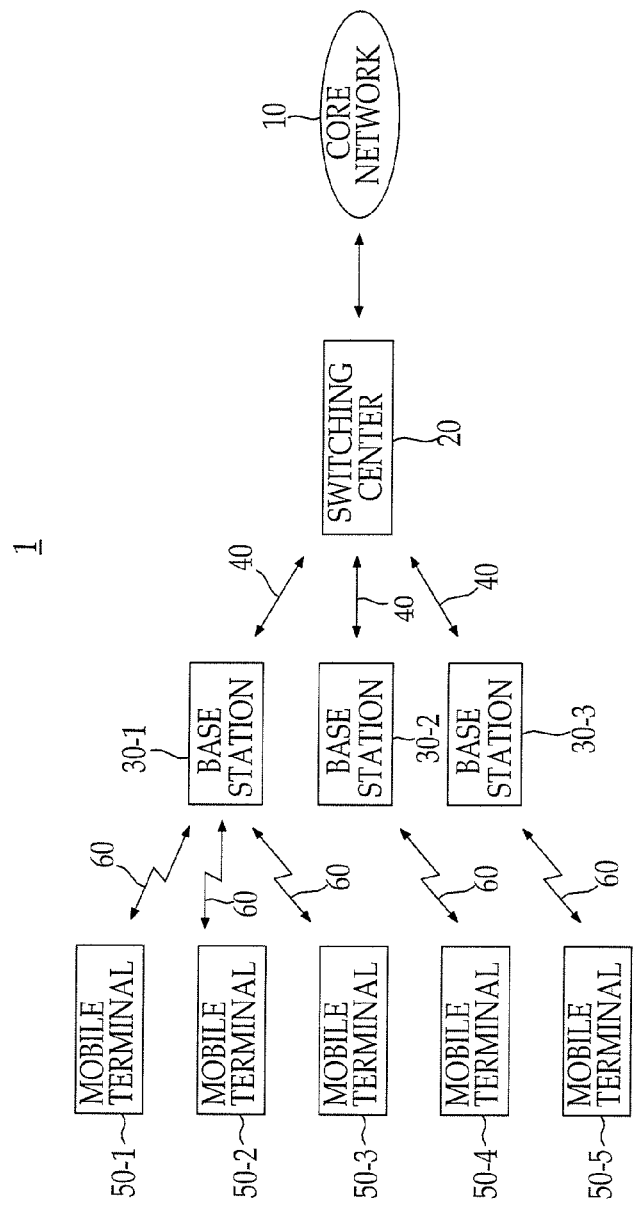
FIG. 1A is a diagram illustrating an example of an entire configuration of a network including a communication device, according to an embodiment.

FIG. 1A is a diagram illustrating an example of an entire configuration of a network including a communication device, according to an embodiment. The network 1 is a network over which communication is performed based on, for example, the 3G (3rd Generation) communication standard. The network 1 includes a switching center 20 connected to a core network 10. Further, the network 1 includes base stations 30-1, 30-2, 30-3 connected to the switching center 20 through a communication link 40. Further, the network 1 includes mobile terminals 50-1, 50-2, 50-3 connected to the base station 30-1 through a radio link 60. Further, the network 1 includes a mobile terminal 50-4 connected to the base station 30-2 through the radio link 60 and a mobile terminal 50-5 connected to the base station 30-3 through the radio link 60. Further, the number of the base stations 30 connected to the switching center 20 or the number of the mobile terminals 50 connected to the base station 30 is not particularly limited.

The communication device of a calling party transmits and receives a signal to and from the communication device of the communication partner through at least one of the communication link 40 and the radio link 60 (hereinafter, appropriately referred to as "communication path 2"). Accordingly, in the present embodiment, any one of the switching center 20, the base station 30 and the mobile terminal 50 may be the communication device. For example, when it is assumed that the mobile terminal 50 is a communication device A transmitting a signal to the communication device of the communication partner, the base station 30 or the switching center 20 becomes a communication device B of the communication partner transmitting a retransmission request to the mobile terminal 50. Further, when it is assumed that the base station 30 is the communication device A transmitting a signal to the communication device of the communication partner, the switching center 20 or the mobile terminal 50 becomes the communication device B of the communication partner transmitting the retransmission request to the base station 30. Further, when it is assumed that the switching center 20 is the communication device A transmitting a signal to the communication device of the communication partner, the base station 30 or the mobile terminal 50 becomes the communication device B of the communication partner transmitting the retransmission request to the switching center 20.

Figure 1B:
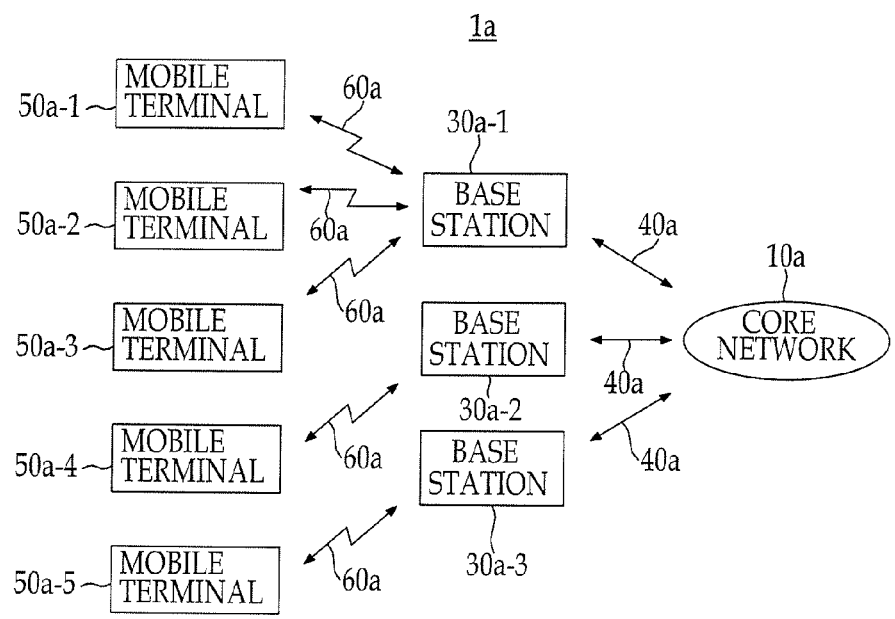
FIG. 1B is a diagram illustrating an example of an entire configuration of a network including a communication device, according to a embodiment.

FIG. 1B is a diagram illustrating an example of an entire configuration of a network including a communication device, according to an embodiment. The network 1a is a network over which a communication is performed based on, for example, the LTE (Long Term Evolution) communication standard. The network 1a includes base stations 30a-1, 30a-2, 30a-3 connected to a core network 10a through communication links 40a. Further, the network 1a includes mobile terminals 50a-1, 50a-2, 50a-3 connected to the base station 30a-1 through radio links 60a. Further, the network 1a includes a mobile terminal 50a-4 connected to the base station 30a-2 through a radio link 60a and a mobile terminal 50a-5 connected to the base station 30a-3 through a radio link 60a. Further, the number of base stations 30a connected to the core network 10a or the number of mobile terminals 50a connected to the base station 30a is not particularly limited.

The communication device of the calling party transmits and receives a signal to and from a communication device of a communication partner through at least one of the communication link 40a and the radio link 60a (hereinafter, appropriately referred to as "communication path 2"). Accordingly, in the embodiment, any one of the base station 30a and the mobile terminal 50 may be the communication device. For example, when it is assumed that the mobile terminal 50a is the communication device A transmitting a signal to the communication device of the communication partner, the base station 30 becomes the communication device B of the communication partner transmitting the retransmission request to the mobile terminal 50a. Further, when it is assumed that the base station 30a is the communication device A transmitting a signal to the communication device of the communication partner, the mobile terminal 50a becomes the communication device B of the communication partner transmitting the retransmission request to the base station 30a.

Figure 2:
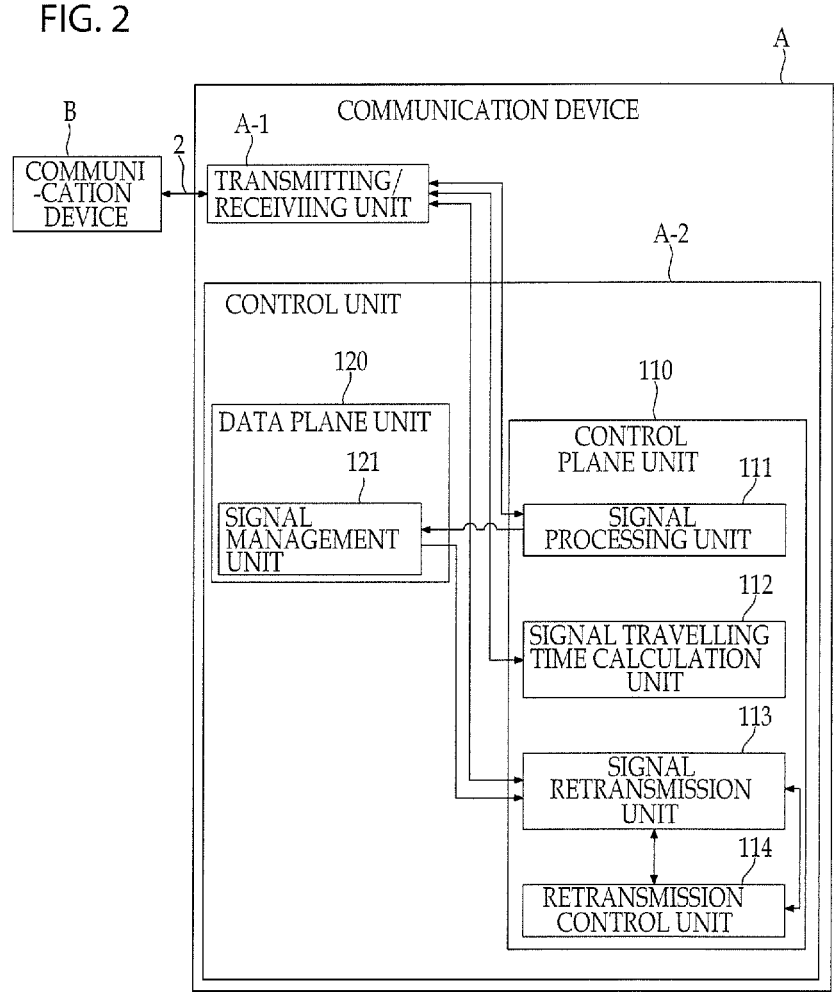
FIG. 2 is a diagram illustrating an example of a configuration of a communication device A and a communication device B, according to an embodiment.

FIG. 2 is a diagram illustrating a configuration example of a communication device A and a communication device B, according to an embodiment. Further, since the communication device A and the communication device B have the same configuration and thus, the description of the configuration of the communication device B is omitted and only the configuration of the communication device A will be described.

As illustrated in FIG. 2, a communication device A according to an embodiment includes a transmitting/receiving unit A-1 and a control unit A-2. Further, the control unit A-2 includes a control plane unit 110 and a data plane unit 120. The control plane unit 110 includes a signal processing unit 111, a signal travelling time calculation unit 112, a signal retransmission unit 113, and a retransmission control unit 114. Further, the data plane unit 120 includes a signal management unit 121.

The transmitting/receiving unit A-1 transmits and receives a signal to and from the communication device B. The transmitting/receiving unit A-1 receives a signal to be transmitted to the communication device B from the signal processing unit 111. The transmitting/receiving unit A-1 transmits the signal received from the signal processing unit 111 to the communication device B through the communication path 2. Hereinafter, a signal transmitted to the communication device B by the signal transmitting/receiving unit A-1 is referred to as appropriately "transmission signal".

Further, the transmitting/receiving unit A-1 receives a signal to be retransmitted to the communication device B from the signal retransmission unit 113. The transmitting/receiving unit A-1 transmits the signal received from the signal retransmission unit 111 to the communication device B through the communication path 2.

Further, the transmitting/receiving unit A-1 receives a signal from the communication device B through the communication path 2. Hereinafter, the signal received by transmitting/receiving unit A-1 from the communication device B is referred to as appropriately "receipt signal". The transmitting/receiving unit A-1 receives a response signal returned from the communication device B as a receipt signal in response to the transmission signal from the communication device A. The response signal is a signal to confirm that the transmission signal has arrived at the communication device B, and is also called ACK (ACKnowledgement). The transmitting/receiving unit A-1 outputs the response signal received from the communication device B to the signal processing unit 111.

Further, the transmitting/receiving unit A-1 receives the retransmission request of signal from the communication device B as a receipt signal. The retransmission request is also called NACK (Negative ACKnowledgement). The transmitting/receiving unit A-1 outputs the retransmission request received from the communication device B to the signal retransmission unit 113.

The signal processing unit 111 produces a transmission signal. For example, when the communication device A is the base station 30, 30a or the switching center, the signal processing unit 111 performs a protocol conversion for data packets received from a higher level device to produce the transmission signal. Further, for example, when the communication device A is the mobile terminal 50 or the mobile terminal 50a, the signal processing unit 111 performs a protocol conversion for, for example, voice data, input from a user to produce the transmission signal. The signal processing unit 111 outputs the produced transmission signal to the transmitting/receiving unit A-1 and the signal management unit 121.

Further, the signal processing unit 111 receives an input of a response signal from the transmitting/receiving unit A-1. The signal processing unit 111 deletes information of the transmission signal of which delivery is confirmed by the response signal from the signal management unit 121.

The signal management unit 121 receives an input of the transmission signal from the signal processing unit 111. The signal management unit 121 stores and accumulates the received transmission signal for each sequence number of the transmission signal. Further, the transmission signal accumulated in the signal management unit 121 is reduced with being deleted by the signal processing unit 111.

The signal travelling time calculation unit 112 determines a signal travelling time which corresponds to a time period between a first time at which the signal is transmitted from the communication device A to the communication device B and a second time at which the signal arrives (being expected to arrive) at the communication device B. For example, the signal travelling time calculation unit 112 calculates the signal travelling time based on a time period between the first time at which a transmission signal is transmitted by the transmitting/receiving unit A-1 to the communication device B and a third time at which a response signal is returned from the communication device B in response to the signal transmitted from the transmitting/receiving unit A-1. For example, the signal travelling time calculation unit 112 calculates the signal travelling time each time when a predetermined period of time comes. The signal travelling time calculated by the signal travelling time calculation unit 112 is held in the signal travelling time calculation unit 112 until a next signal travelling time is calculated. Further, the details of a process of calculating the signal travelling time by the signal travelling time calculation unit 112 will be described later.

The signal retransmission unit 113 receives an input of the retransmission request from the transmitting/receiving unit A-1. Upon receipt of the retransmission request, the signal retransmission unit 113 retransmits the signal to the communication device B through the transmitting/receiving unit A-1. For example, the signal retransmission unit 113 acquires the transmission signal corresponding to a sequence number specified by the retransmission request from the signal management unit 121 and retransmits the acquired transmission signal to the communication device B through the transmitting/receiving unit A-1. Further, when the signal is retransmitted, the signal retransmission unit 113 notifies the retransmission control unit 114 that the signal is retransmitted.

Upon receipt of the retransmission request again from the communication device B in a period of time before a signal travelling time elapses after retransmitting the signal to the communication device B, the retransmission control unit 114 suspends the retransmission of the signal. Specifically, when the signal is retransmitted from the signal retransmission unit 113 which has received the retransmission request, the retransmission control unit 114 accesses the signal travelling time calculation unit 112 to read the signal travelling time. The retransmission control unit 114 adds the signal travelling time read and a time at which the signal was retransmitted, to obtain a retransmission suspension time period during which the retransmission of signal is to be suspended. That is, the retransmission suspension time period indicates a time period from a first time at which the communication device A has retransmitted the signal to the communication device B, to a second time at which the signal travelling time elapses from the first time. When the signal retransmission unit 113 receives the retransmission request again at a time not exceeding the retransmission suspension time period, the retransmission control unit 114 sends a command to suspend the retransmission of signal to the signal retransmission unit 113.

Further, upon receipt of the retransmission request again from the communication device B after the signal travelling time has elapsed from a time at which the signal was retransmitted to the communication device B, the retransmission control unit 114 restarts the retransmission of the signal. Specifically, when the signal retransmission unit 113 has received the retransmission request again at a time exceeding the retransmission suspension time period, the retransmission control unit 114 sends a command to restart the retransmission of signal to the signal retransmission unit 113.

Here, the details of a process of calculating the signal travelling time by the arrival calculation unit 112 will be described. When the transmission signal is transmitted to the communication device B by the transmitting/receiving unit A-1, the signal travelling time calculation unit 112 determines whether the transmitted signal is a signal which requests transmitting of a response signal, such as a handshake signal. For example, it is assumed that the transmission signal is a User Data (AMD-PDU) signal specified by 3G communication standard. Then, in a case where a P-bit contained in the User Data (AMD-PDU) signal is set at ON, the signal travelling time calculation unit 112 determines that the signal is a handshake signal. Also, when the transmission signal is a handshake signal, the signal travelling time calculation unit 112 acquires a time at which the transmission signal is transmitted to the communication device B (hereinafter, referred to as appropriately "transmission time").

In the meantime, when the receipt signal is received from the communication device B by the transmitting/receiving unit A-1, the signal travelling time calculation unit 112 determines whether the receipt signal is a response signal corresponding to the handshake signal. For example, it is assumed that the receipt signal is a User Data (AMD-PDU) signal specified by 3G communication standard. Then, in a case where 0010 is set in a SUFI TYPE field contained in a Control Data (STATUS-PDU) signal and also a predetermined condition is satisfied, the signal travelling time calculation unit 112 determines that the signal is a response signal corresponding to the handshake signal. Further, the fact that the predetermined condition is satisfied indicates that, for example, SN+1 set in the User Data (AMD-PDU) signal in which the P-bit is set at ON coincides with ACK LSN set in the Control Data (STATUS-PDU) signal. Also, when the receipt signal is the response signal corresponding to the handshake signal, the signal travelling time calculation unit 112 acquires a time (hereinafter, referred to as appropriately "receipt time") at which the receipt signal was received by the transmitting/receiving unit A-1. Also, the signal travelling time calculation unit 112 measures a round trip time which is a difference between the transmission time and the receipt time. For example, the signal travelling time calculation unit 112 measures a signal travelling time using the following equation (1)

$$\text{signal travelling time} = \text{round trip time} \times \tfrac{1}{2} \qquad (1)$$

Figure 3:
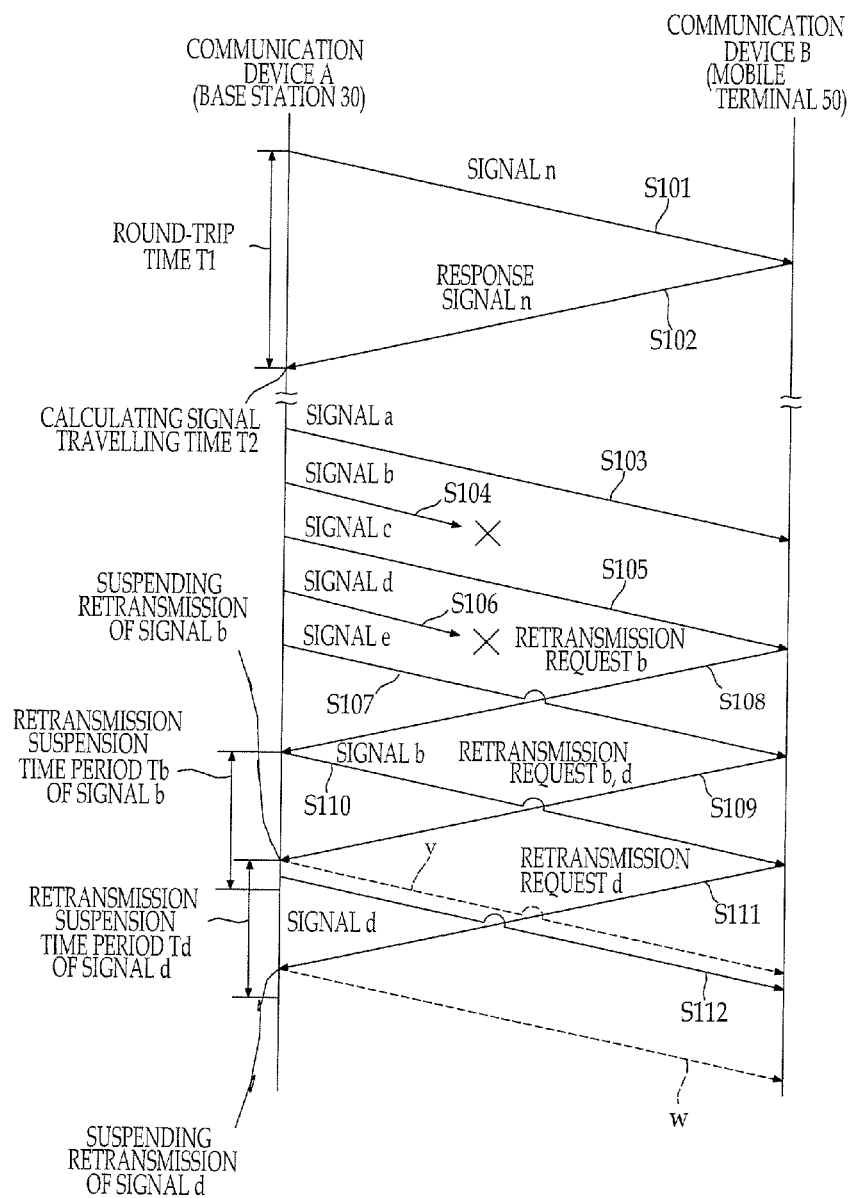
FIG. 3 is a signal sequence chart illustrating an example of states of communications of a communication device A and a communication device B, according to an embodiment.

Next, a communication state between the communication device A and the communication device B will de described. FIG. 3 is a signal sequence chart illustrating the communication state of a communication device A and a communication device B according to an embodiment in a chronological order. In the example illustrated in FIG. 3, the communication device A is the base station 30 and the communication device B is the mobile terminal 50.

First, the communication device A transmits a signal "n" which is a handshake signal to the communication device B (step S101). The communication device B that has received the signal "n" transmits a response signal "n" corresponding to the signal "n" to the communication device A (step S102). Since the signal "n" is a handshake signal, the signal travelling time calculation unit 112 of the communication device A acquires a transmission time at which the signal "n" is transmitted from the transmitting/receiving unit A-1 to the communication device B at step S101. In the meantime, since the response signal "n" corresponds to the handshake signal, the signal travelling time calculation unit 112 acquires a receipt time at which the response signal "n" is received by the transmitting/receiving unit A-1 at step S102. Then, the signal travelling time calculation unit 112 calculates a round trip time T1 which corresponds to a difference between the transmission time and the receipt time. The signal travelling time calculation unit 112 calculates the signal travelling time T2 using the equation (1) described above. The calculated signal travelling time T2 is held in the signal travelling time calculation unit 112.

Thereafter, the communication device A transmits signal "a" having a sequence number of 0 (zero) to the communication device B (step S103). It is assumed that the signal "a" arrives at the communication device B. Subsequently, the communication device A transmits signal "b" having a sequence number of 1 (one) to the communication device B (step S104). It is assumed that the signal "b" does not arrive at the communication device B. Subsequently, the communication device A transmits signal "c" having a sequence number of 2 (two) to the communication device B (step S105). It is assumed that the signal "c" arrives at the communication device B. Subsequently, the communication device A transmits signal "d" having a sequence number of 3 (three) to the communication device B (step S106). It is assumed that the signal "d" does not arrive at the communication device B. Subsequently, the communication device A transmits signal "e" having a sequence number of 4 (four) to the communication device B (step S107). It is assumed that the signal "e" arrives at the communication device B.

In the meantime, the communication device B which has received the signal "c" detects that the signal "b" is missed and transmits a retransmission request of the signal "b" to the communication device A (step S108). The communication device B which has received the signal "e" has not yet received the signal "b" and the signal "d". Therefore, the communication device B detects that the signal "b" and signal "d" are missed and transmits the retransmission request of the signal "b" and a retransmission request of the signal "d" to the communication device A (step S109).

Further, as for a method for detecting the signal missing in the communication device B, for example, when a signal is received, a retransmission request may be sent for one or more signals not yet received among signals to be received earlier than the received signal. This eliminates the need for storing information on the transmitting of the retransmission request.

The communication device A which has received the retransmission request "b" transmitted at step S108 retransmits the signal "b" to the communication device B (step S110). It is assumed that the signal "b" arrives at the communication device B. The communication device B which has received the signal "b" has not yet received the signal "d". Therefore, the communication device B detects that the signal "d" is missed and transmits the retransmission request of the signal "d" to the communication device A (step S111). At step S110, when the signal "b" is retransmitted from the signal retransmission unit 113, the retransmission control unit 114 of the communication device A accesses the signal travelling time calculation unit 112 to read the signal travelling time T2. The retransmission control unit 114 adds the signal travelling time T2 read and the time tb at which the signal "b" was retransmitted from the signal retransmission unit 113 to obtain a retransmission suspension time period Tb for the signal "b", which is a time period from the time tb at which the communication device A retransmitted the signal "b" to the communication device B, to a time at which the signal travelling time T2 elapses from the time tb.

In the meantime, the communication device A, which has received the retransmission request of the signal "b" and the retransmission request of the signal "d" transmitted at step S109, retransmits the signal "d" to the communication device B while suspending retransmission of the signal "b" (step S112). It is assumed that the signal "d" arrives at the communication device B. When the signal "d" is retransmitted from the signal retransmission unit 113 at step S112, the retransmission control unit 114 of the communication device A accesses the signal travelling time calculation unit 112 to read the signal travelling time T2. The retransmission control unit 114 adds the signal travelling time T2 read and the time td at which the signal "d" was retransmitted from the signal retransmission unit 113 to obtain a retransmission suspension time period Td for the signal "d", which is a time period from the time td at which the communication device A retransmitted the signal "d" to the communication device B, to a time at which the signal travelling time T2 elapses from the time td. In the meantime, since the current time at which the retransmission request "b" is again received by the signal retransmission unit 113 does not exceed the retransmission suspension time period Tb of the signal "b", the retransmission control unit 114 of the communication device A sends a command to suspend the retransmission of the signal "b" to the signal retransmission unit 113. That is, since the retransmission control unit 114 of the communication device A has received the retransmission request from the signal retransmission unit 113 within the retransmission suspension time period Tb, the retransmission control unit 114 of the communication device A does not retransmit the signal "b".

Assuming that the signal retransmission unit retransmits signals for all of the received retransmission requests, since the retransmission request "b" is received again at the signal retransmission unit even when the signal "b" retransmitted first has arrived at the communication device B, the communication device A retransmits the signal "b" (see the dotted line v in FIG. 3). However, according to the embodiment, the retransmission of the signal "b" is suspended during the retransmission suspension time period Tb. Accordingly, even if the communication device A has received the retransmission request "b" again after retransmitting the signal "b" to the communication device B, when the current time at which the retransmission request "b" is again received does not exceed the retransmission suspension time period Tb of the signal "b", the retransmission control unit 114 of the communication device A does not retransmit the signal "b".

In the meantime, the communication device A that has received the retransmission request "d" transmitted at step S111 suspends the retransmission of the signal "d". Since the current time at which the retransmission request "b" received again by the signal retransmission unit 113 does not exceed the retransmission suspension time period Td of the signal "d", the retransmission control unit of the communication device A sends a command to suspend the retransmission of the signal "d" to the signal retransmission unit 113. That is, since the retransmission request "d" is received again at the signal retransmission unit 113 within the retransmission suspension time period Td, the retransmission control unit 114 of the communication device A does not retransmit the signal "d".

Assuming that the signal retransmission unit retransmits signals for all of the received retransmission requests, since the retransmission request "d" is received again at the signal retransmission unit even when the signal "d" retransmitted first has arrived at the communication device B, the communication device A retransmits the signal "d" (see the dotted line w in FIG. 3). However, according to the embodiment, the retransmission of the signal "d" is suspended within the retransmission suspension time period Td. Accordingly, even if the communication device A receives the retransmission request of the signal "b" again after retransmitting the signal "b" to the communication device B, when the current time at which the retransmission request of the signal "d" is again received does not exceed the retransmission suspension time period Td of the signal "d", the retransmission control unit 114 of the communication device A does not retransmit the signal "d".

Figure 4A:
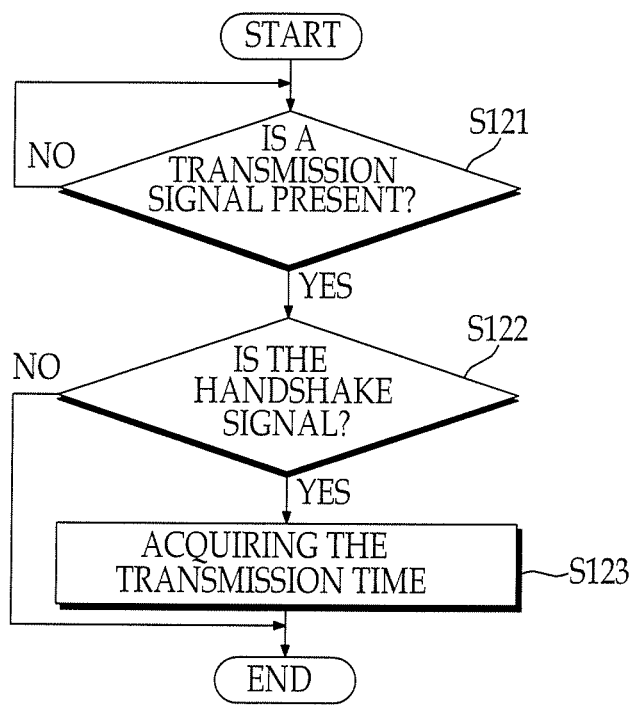
FIG. 4A is a diagram illustrating an example of an operational flowchart for calculating a signal travelling time by a communication device, according to an embodiment.
Figure 4B:
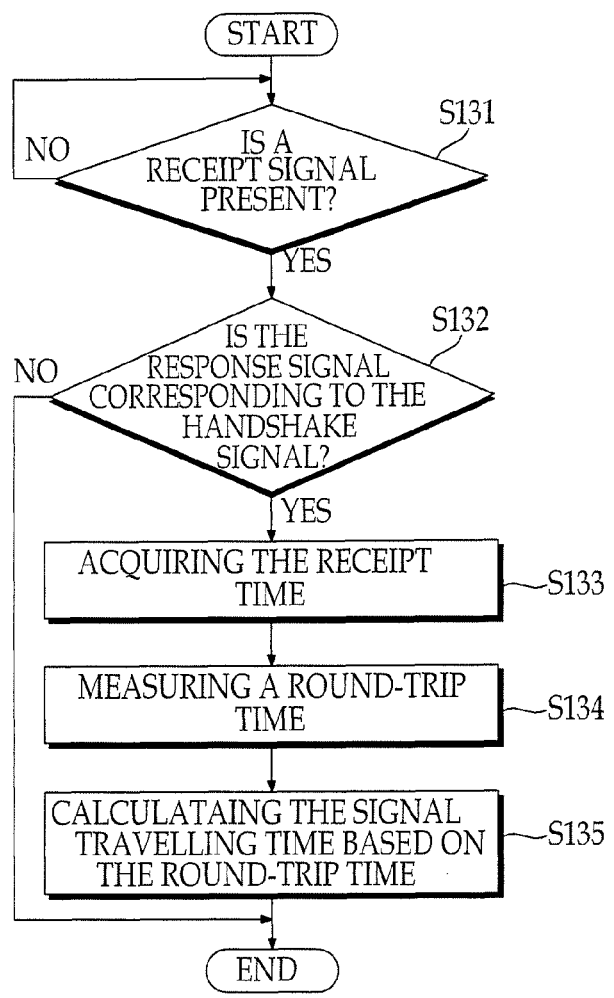
FIG. 4B is a diagram illustrating an example of an operational flowchart for calculating a signal travelling time by a communication device, according to an embodiment.

Next, a processing sequence of the communication device A according to the present embodiment will be described. FIGS. 4A and 4B are operational flowcharts illustrating a processing sequence of calculating a signal travelling time by the communication device according to an embodiment.

As illustrated in FIG. 4A, when a transmission signal transmitted from the transmitting/receiving unit A-1 is not present (No in step S121), the signal travelling time calculation unit 112 of the communication device A causes the process to return to step S121. When a transmission signal transmitted from the transmitting/receiving unit A-1 to the communication device A is present (Yes in step S121), the signal travelling time calculation unit 112 determines whether the transmission signal is a handshake signal (step S122). When it is determined that the transmission signal is not a handshake signal (No in step S122), the signal travelling time calculation unit 112 causes the process to end.

In the meantime, when it is determined that the transmission signal is a handshake signal (Yes in step S122), the signal travelling time calculation unit 112 acquires a transmission time at which a transmission signal is transmitted to the communication device B (step S123), and causes the process to end.

As illustrated in FIG. 4B, when a receipt signal received by the transmitting/receiving unit A-1 from the communication device B is not present (No in step S131), the signal travelling time calculation unit 112 causes the process to return to step S131. In the meantime, when a receipt signal received by the transmitting/receiving unit A-1 from the communication device B is present (Yes in step S131), the signal travelling time calculation unit 112 determines whether the transmission signal is a response signal corresponding to the handshake signal (step S132). When it is determined that the receipt signal is not the response signal corresponding to the handshake signal (No in step S132), the signal travelling time calculation unit 112 causes the process to end.

In the meantime, when it is determined that the transmission signal is a response signal corresponding to the handshake signal (Yes in step S132), the signal travelling time calculation unit 112 acquires a receipt time at which a receipt signal is received from the communication device B (step S133). Also, the signal travelling time calculation unit 112 measures a round-trip time which is a difference between the transmission time acquired at step S123 and the receipt time acquired at step S133 (step S134). Also, the signal travelling time calculation unit 112 calculates a signal travelling time based on the round-trip time (step S135), and causes the process to end. Further, the signal travelling time calculated by the signal travelling time calculation unit 112 is held in the signal travelling time calculation unit 112 until the signal travelling time is calculated at next time.

Next, a processing sequence of retransmitting of a signal by the communication device A according to an embodiment will be described. FIG. 5 is an operational flowchart illustrating a processing sequence of retransmitting of signal by a communication device according to an embodiment.

As illustrated in FIG. 5, when the retransmission request from the communication device B is not received at the signal retransmission unit 113 (No in step S141), the retransmission control unit 114 of the communication device A causes the process to return to step S141. In the meantime, when the retransmission request from the communication device B is received at the signal retransmission unit 113 (Yes in step S141), the retransmission control unit 114 determines whether the signal corresponding to the sequence number specified by the retransmission request has been retransmitted from the signal retransmission unit 113 (step S142).

When it is determined that the signal has not been retransmitted from the signal retransmission unit 113 (No in step S142), the retransmission control unit 114 causes the signal to be retransmitted through the signal retransmission unit 113 (step S143), and performs computing of a retransmission suspension time period (step S144). The computing of retransmission suspension time period is a processing for obtaining a retransmission suspension time period during which retransmission of signal is to be suspended. The details of computing of retransmission suspension time limit will be described with reference to FIG. 6 hereinbelow.

In the meantime, when it is determined that the signal has been retransmitted already from the signal retransmission unit 113, that is, the retransmission request from the communication device B is received again at the signal retransmission unit 113b (Yes in step S142), the retransmission control unit 114 performs the following processing. That is, the retransmission control unit 114 acquires the current time at which the retransmission request is received again (step S145). Subsequently, the retransmission control unit 114 determines whether the current time at which the retransmission request is again received exceeds the retransmission suspension time period (step S146).

When it is determined that the current time at which the retransmission request is again received does not exceed the retransmission suspension time period (No in step S146), the retransmission control unit 114 sends a command to suspend the retransmission of signal to the signal retransmission unit 113 (step S147), and causes the process to end.

In the meantime, when it is determined that the current time at which the retransmission request is again received exceeds the retransmission suspension time period (Yes in step S146), the retransmission control unit 114 sends a command to restart the retransmission of signal to the signal retransmission unit 113 (step S148), and causes the process to proceed to step S143. At step S143, the retransmission control unit 114 causes the signal to be retransmitted through the signal retransmission unit 113. At step S144, the retransmission control unit 114 performs the computing of the retransmission suspension time period and updates the retransmission suspension time period held. According to this, a period of time between a first time at which the signal was retransmitted from the signal retransmission unit 113 for the last time and a second time at which the signal travelling time has elapsed from the first time is newly obtained as the retransmission suspension time period.

Figure 6:
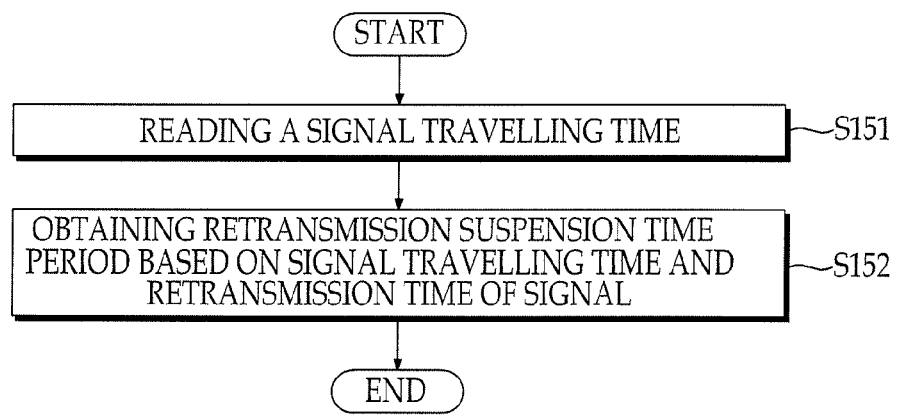
FIG. 6 is a diagram illustrating an example of an operational flowchart for computing a retransmission suspension time period, according to an embodiment.

Next, the details of the computing of the retransmission suspension time period will be described. FIG. 6 is an example of an operational flowchart illustrating a processing sequence of computing a retransmission suspension time period. The processing sequence illustrated in FIG. 6 corresponds to step S144 of FIG. 5.

As illustrated in FIG. 6, when the signal is retransmitted from the signal retransmission unit 113 at step S143, the retransmission control unit 114 accesses the signal travelling time calculation unit 112 to read a signal travelling time (step S151). Subsequently, the retransmission control unit 114 adds the signal travelling time read to a first time at which the signal is retransmitted from the signal retransmission unit 113 at step S143, to obtain a second time at which the signal travelling time elapses from the first time, thereby obtaining the retransmission suspension time period from the first time to the second time, during which the retransmission of the signal is to be suspended (step S152), and causes the process to end.

As described above, the communication device A according to the embodiment calculates a signal travelling time required for a transmitted signal to arrive at the communication device B, and suspends the retransmission of the signal when the retransmission request is received from the communication device B during a time period from a first time at which the signal has been retransmitted lastly, to a second time at which the signal travelling time elapses from the first time. According to this, the communication device A does not perform the retransmission of the signal which may not be performed originally. Accordingly, according to the communication device of the embodiment, it is possible to suppress the increase of an amount of data flowing in a communication path 2 between the communication device A and the communication device B. As a result, it is possible to reduce the communication overhead between the communication device A and the communication device B according to the communication device of the embodiment.

Further, when the retransmission request is received from the communication device B after the signal is retransmitted for the last time and then the signal travelling time has elapsed, the communication device A of the embodiment restarts the retransmission of the signal. According to this, the communication device A is able to perform the retransmission of the signal appropriately for the retransmission request produced from the communication device B due to a non-arrival of the signal retransmitted for the last time at the communication device B. Accordingly, according to the communication device of the embodiment, it is possible to perform the retransmission of the signal which is desirable to be performed originally while suppressing the increase of an amount of data flowing in a communication path 2 between the communication device A and the communication device B. As a result, according to the communication device of the embodiment, it is possible to avoid missing of signal while suppressing the decrease of a communication speed between the communication device A and the communication device B.

Further, the communication device A of the embodiment calculates the signal travelling time based on a round trip time ranging from a time at which the signal is transmitted to the communication device B to a time at which a response signal returned from the communication device B in response to the transmitted signal is received at the communication device A. Accordingly, according to the communication device of the embodiment, it becomes possible to rapidly calculate the signal travelling time with a simple configuration of measuring a round trip time.

Further, in the description described above, an example is illustrated in which the signal travelling time calculation unit 112 of the communication device A calculates the signal travelling time based on the round trip time, but the calculation of the signal travelling time is not limited thereto. For example, the signal travelling time may be determined by holding a table in which the round trip time is stored in association with the signal travelling time and retrieving the table with the round trip time.

(Hardware Configuration)

Figure 7:
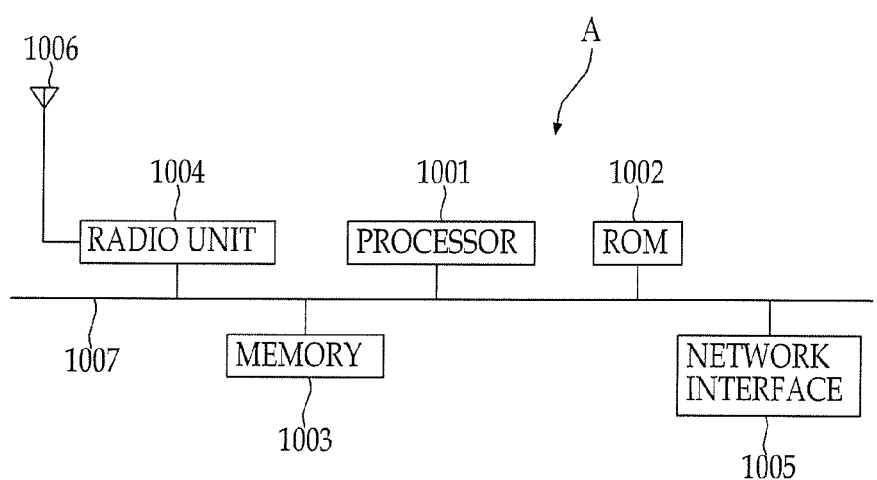
FIG. 7 is a diagram illustrating an exemplary hardware configuration of a communication device, according to an embodiment.

Next, a hardware configuration of the communication device A according to the embodiment will be described. FIG. 7 is a diagram illustrating an exemplary hardware configuration of the communication device A. Here, the communication device A is the base station 30.

As illustrated in FIG. 7, the communication device A includes a processor 1001, a ROM (Read Only Memory) 1002, a memory 1003, a radio unit 1004, a network interface 1005, and an antenna 1006.

The ROM 1002, the memory 1003, the radio unit 1004, and the network interface 1005 are connected with the processor 1001 through the bus 1007, respectively.

The network interface 1005 is, for example, an interface for connecting with a higher level device.

The antenna 1006 is connected to the radio unit 1004. For example, functions of the transmitting/receiving A-1 illustrated in FIG. 2 are implemented by the radio unit 1004 and the processor 1001.

The ROM 1002 stores programs used for processing performed by, for example, a control plane unit 110 and a data plane unit 120 stored therein. Also, the processor 1001 reads various programs stored in the ROM 1002, and deploys the read programs on the memory 1003 to produce and execute a process performing each processing.

For example, the functions described above performed by the control plane unit 110 and the data plane unit 120 illustrated in FIG. 2 are implemented by the processor 1001, the ROM 1002, and the memory 1003.

Figure 8:
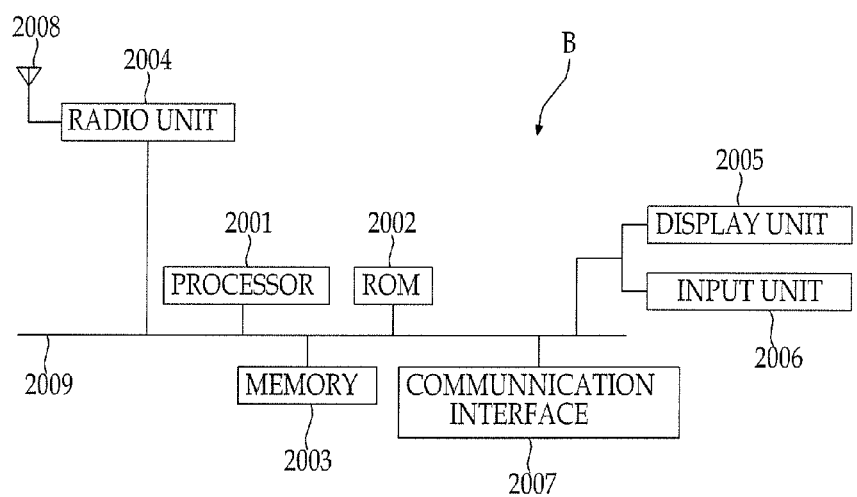
FIG. 8 is a diagram illustrating an exemplary hardware configuration of a communication device, according to an embodiment.

A hardware configuration of the communication device B according to the present embodiment will be described. FIG. 8 is a diagram illustrating an exemplary hardware configuration of the communication device B. Here, the communication device B is the mobile terminal 50.

As illustrated in FIG. 8, the communication device B includes a processor 2001, a ROM 2002, a memory 2003, a radio unit 2004, a display unit 2005, an input unit 2006, a communication interface 2007, and an antenna 2008.

The ROM 2002, the memory 2003, the radio unit 2004, the display unit 2005, the input unit 2006, and the communication interface 2007 are connected with the processor 2001 through the bus 2009, respectively.

The display unit 2005 is, for example, a liquid crystal screen. Further, input unit 2006 is, for example, a keypad. An operator of the communication device B inputs various information using the display unit 2005 and the input unit 2006.

The communication interface 2007 is, for example, a speaker or a microphone. An operator of the communication device B performs operations, such as transmitting and receiving of voice using the communication interface 2007.

The antenna 2008 is connected to the radio unit 2004.

The ROM 2002 stores programs for executing processing stored therein. Also, the processor 2001 reads various programs stored in the ROM 2002, and deploys the read programs on the memory 2003 to produce and execute a process performing each processing.

According to one aspect of the communication device disclosed herein, the communication overhead between the communication devices caused by the retransmission of signal may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A communication device comprising:
a signal retransmission unit configured to retransmit a signal to another communication device serving as a communication partner when a retransmission request of the signal is received after the signal has been transmitted to the another communication device; and
a retransmission control unit configured to suspend a retransmission of the signal when the retransmission request is received again from the another communication device before a signal travelling time elapses from a first time at which the signal has been transmitted from the communication device, the signal travelling time indicating a time period from the first time to a second time at which the transmitted signal is expected to arrive at the another communication device.

2. The communication device of claim 1, wherein
when the retransmission request is received again after the signal travelling time has elapsed from the first time, the retransmission control unit restarts the retransmission of the signal.

3. The communication device of claim 1, further comprising
a signal travelling time calculation unit configured to determine the signal travelling time based on a round-trip time indicating a time period from the first time to a third time at which a response signal returned from the another communication device in response to the signal transmitted from the communication device is received at the communication device.

4. A communication method performed by a communication device, the communication method comprising:
calculating a signal travelling time indicating a time period from a first time at which a signal is transmitted from the communication device to a second time at which the transmitted signal is expected to arrive at another communication device serving as a communication partner;
retransmitting the signal to the another communication device when a retransmission request of the signal is received from the another communication device after the signal has been transmitted to the another communication device; and
suspending a retransmission of the signal when the retransmission request is received again from the another communication device before the signal travelling time elapses from the first time.

5. The communication method of claim 4, further comprising
restarting the retransmission of the signal when the retransmission request is received again from the another communication device after the signal travelling time has elapsed from the first time.

6. The communication method of claim 4, wherein
the signal travelling time is determined based on a round-trip time indicating a time period from the first time to a third time at which a response signal returned from the another communication device in response to the signal transmitted from the communication device is received at the communication device.

* * * * *